United States Patent [19]

MacDonald et al.

[11] Patent Number: 5,463,480
[45] Date of Patent: Oct. 31, 1995

[54] IMAGE PROCESSOR FOR OUTPUT DEVICES WHICH TRANSFORMS DATA INTO ACCEPTABLE COLOR SPACE

[75] Inventors: Lindsay W. MacDonald; Anthony J. Johnson, both of Bedfordshire; Ronnier Luo, Leicestershire, all of England

[73] Assignee: Crosfield Electronics Limited, Stevenage, England

[21] Appl. No.: 665,123

[22] Filed: Mar. 6, 1991

[30] Foreign Application Priority Data

Mar. 6, 1990 [GB] United Kingdom ............... 9005030

[51] Int. Cl.$^6$ ........................... H04N 1/46; G03F 3/08
[52] U.S. Cl. .................... 358/520; 358/515; 358/518
[58] Field of Search .................. 358/75, 76, 80, 358/500, 520, 522, 515, 521, 518, 519, 501, 504; 395/131; 340/703

[56] References Cited

U.S. PATENT DOCUMENTS

| | | | |
|---|---|---|---|
| 4,488,245 | 12/1984 | Dalke et al. | 358/80 |
| 4,500,919 | 2/1985 | Schreiber | 358/80 |
| 4,667,228 | 5/1987 | Kawamura et al. | 358/80 |
| 4,758,885 | 7/1988 | Sasaki et al. | 358/520 |
| 4,774,567 | 9/1988 | Stansfield et al. | 358/80 |
| 4,819,077 | 4/1989 | Kikuchi et al. | 358/80 |
| 4,843,573 | 6/1989 | Taylor et al. | 395/131 |
| 4,941,039 | 7/1990 | E'Errico | 358/80 |
| 5,111,286 | 5/1992 | MacDonald et al. | 358/75 |

FOREIGN PATENT DOCUMENTS

| | | |
|---|---|---|
| 273398 | 7/1988 | European Pat. Off. . |
| 310388 | 4/1989 | European Pat. Off. . |
| 321983 | 6/1989 | European Pat. Off. . |
| 8605901 | 10/1986 | WIPO . |

OTHER PUBLICATIONS

Robertson, Philip K., "Visualizing Color Gamuts: A User Interface for the Effective Use of Perceptual Color Spaces in Data Displays", IEEE Computer Graphics and Applications, Sep. 1988, pp. 50–64.
Patent Abstracts of Japan, vol. 13, No. 381, Aug. 23, 1989, JP 1–130691.

*Primary Examiner*—Edward L. Coles, Sr.
*Assistant Examiner*—Kimberly A. Williams
*Attorney, Agent, or Firm*—Sughrue, Mion, Zinn, Macpeak & Seas

[57] ABSTRACT

A method and apparatus for processing data representing an image in a first color space suitable for controlling a first image output device. The apparatus comprises a processor (11, 14, 17) for reversibly transforming the image into a perceptual color space defined by lightness, colorfulness and hue components, and for modifying the lightness, colorfulness and hue components of the image in accordance with a predetermined algorithm so that all colors in the image fall within the gamut of a second image output device; and a store for storing data defining the modified and unmodified lightness, colorfulness and hue components.

8 Claims, 7 Drawing Sheets

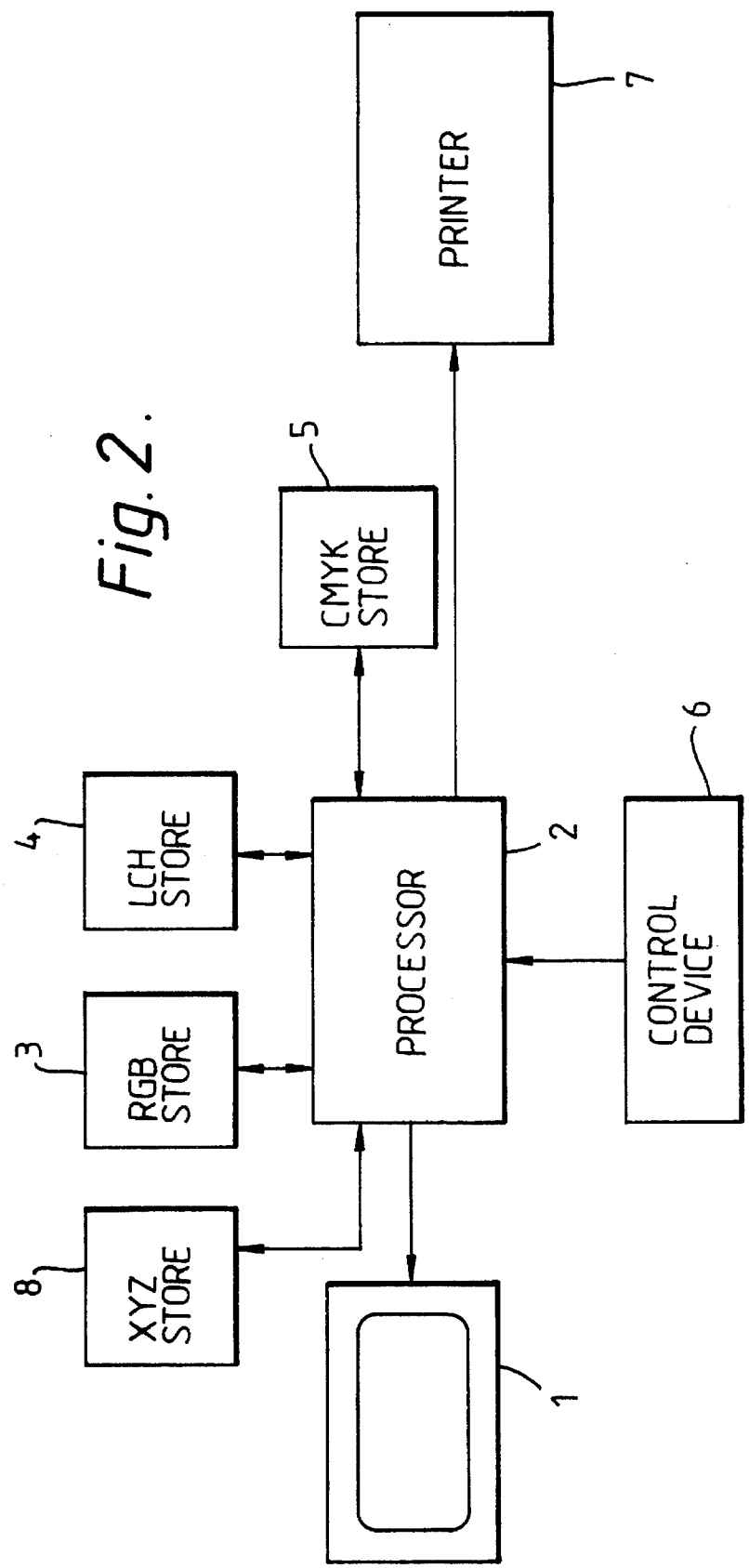

IMAGE PROCESSOR FOR OUTPUT DEVICES WHICH TRANSFORMS DATA INTO ACCEPTABLE COLOR SPACE

FIELD OF THE INVENTION

The invention relates to methods and apparatus for processing data representing an image.

DESCRIPTION OF THE PRIOR ART

The digital representation of coloured images is particularly useful in design systems for architecture, interior decoration, textiles, graphic arts, and industrial products. In these applications the user frequently has to specify the colour of a final product according to what he sees on a display screen. It is important therefore that a final "hard copy" version of what is seen accurately reproduces the colours viewed on the screen and vice versa. At present, it is estimated, for example, that in some industries there is a wastage of up to 30% due to the need to remake hard copies due to colour specification problems.

Various different problems of monitor and printer displays have been recognised in the past and attempts have been made to address these. One particular problem is the difference in gamut between different colour image display devices. For example, a conventional display monitor will respond to signals representing red, green and blue (RGB) colour components while a colour printer will typically respond to signals representing cyan, magenta, and yellow (CMY) colour components. A problem arises in this situation because the gamut of colours displayable on a display monitor is generally not the same as the gamut of colours that can be printed. This is exemplified in FIG. 1 which shows the gamut 1 of a typical RGB phosphor monitor and the gamut 2 of a CMY printing process viewed under a D65 illuminant. It will be immediately apparent that neither gamut 1, nor gamut 2 is a subset of the other, that is the two sets of colours are disjoint. This means that some printable colours cannot be displayed on a monitor (those outside the solid triangle 1) and some displayable colours cannot be printed (those outside the dotted polygon 2).

Various attempts have been made in the past to compensate for differences in gamut between output devices and one such example is described in EP-A-0209266.

The method of U.S. Pat. No. 4,758,885 attempts to apply a system for colour gamut compression used in NTSC television to the problem of transferring colour from monitor to ink-jet printer. The input RGB signals are converted into CIE L*u*v* coordinates, compressed, then converted back into modified RGB by fixed (pre-computed) lookup tables in read-only memory (ROM). The resultant RGB signals are then converted directly into CMY for printing. The process is therefore non-adjustable except by replacing the ROM, and relies on fixed colour characteristics for both monitor phosphors and printing inks.

The invention of EP-A-321983 consists of a fast look-up table generator in which a computer takes stored corrective functions and generates the contents of a look-up table that converts RGB input signals directly into CMY output signals. The loading of the table takes into account first setting the white points equal, second conforming the achromatic axes, and third truncating colours to the gamut boundary of the output printing device. Colour manipulation for the purposes of table set-up is performed in the CIE L*a*b* colour space, though in operation the signals are not transformed into this intermediate form.

Another such method is described in JPA-1-130691.

The main problem with these existing methods is that they operate on the original colour components which are sensitive to external conditions such as ambient illumination and the like and are not adaptable to take account of viewing conditions and the like.

SUMMARY OF THE INVENTION

In accordance with one aspect of the present invention, a method of processing data representing an image in a first colour space suitable for controlling a first image output device comprises reversibly transforming the image into a perceptual colour space defined by lightness, colourfulness and hue components; and modifying the lightness, colourfulness and hue components of the image in accordance with a predetermined algorithm so that all colours in the image fall within the gamut of a second image output device.

In accordance with a second aspect of the present invention, apparatus for processing data representing an image in a first colour space suitable for controlling a first image output device comprises processing means for reversibly transforming the image into a perceptual colour space defined by lightness, colourfulness and hue components, and for modifying the lightness, colourfulness and hue components of the image in accordance with a predetermined algorithm so that all colours in the image fall within the gamut of a second image output device; and storage means for storing data defining the modified and unmodified lightness, colourfulness and hue components.

We have devised a new method and apparatus for achieving gamut compensation in which an image is reversibly transformed from a first set of colour coordinates into a perceptual colour space which can then be modified depending upon the device by which the image is to be output to take account of the gamut of that output device. The advantage of this is that the conversion to perceptual colour space automatically takes account of true colour appearance which is normally affected by viewing conditions such as the level and spectral distribution of the light source, also ambient illumination, surround, presentation medium and the like while the image represented in perceptual colour space will more nearly match the attributes of human perception mechanism and thus be much easier to assess and modify.

The predetermined algorithm may implement various gamut mapping techniques. For example, a simple algorithm limits all colours that fall outside some common gamut subset to the boundary of that subset leaving those colours inside unaltered. These algorithms can be easily implemented but may change the appearance of the limited colours relative to the original. Other algorithms involve linear scaling of one or more attributes of all colours, both inside and outside the common gamut subset. A preferred algorithm comprises scaling the lightness component by the ratio of the lightness values (L) of the reference whites, scaling the colourfulness by an approximately equal factor, and leaving the hue unchanged. This has the effect of preserving the colour appearance of the entire scene. Other non-linear gamut mapping algorithms are also possible.

A significant advantage of the invention is that the predetermined algorithm need not be fixed. Thus in one application, the method further comprises interactively generating the predetermined algorithm by:

a) displaying the image as represented in perceptual colour space and indicating on the display those pixels whose colours fall outside the gamut of the second image output device;

b) generating scaling factors for one or more of the lightness, colourfulness and hue components;

c) modifying the image as represented in perceptual colour space in accordance with the scaling factors;

d) repeating steps a–c until the displayed image is satisfactory; and thereafter;

e) setting any remaining pixels whose colours fall outside the gamut of the second image output device to colours within the gamut.

The displaying step will typically comprise converting the image to monitor format colour components and displaying the image on a monitor.

In another, non-interactive, application, the predetermined algorithm is generated by constructing a histogram of the lightness and colourfulness values of the pixels falling outside the gamut of the second image output device; generating scaling factors for the lightness and colourfulness components so that a proportion of the out of gamut pixels are brought within the gamut and modifying the image as represented in perceptual colour space in accordance with the scaling factors; and setting any remaining pixels whose colours fall outside the gamut of the second image output device to in gamut colours.

In some cases the proportion will be 100% but typically it will be less, for example substantially 90%.

Various proposals have been made in the past to transform an image into perceptual colour space. The method we prefer is a colour appearance model (CAM) described in a book entitled "Measuring Colour", chapter 8 by R. W. G. Hunt (Ellis Horwood, 1987). This model takes the CIE tristimulus values XYZ and transforms them into the perceptual colour space components (LCH), corresponding closely to the perceptual attributes of the human visual system.

Preferably, the step of transforming the image into perceptual colour space comprises an initial step of representing the image by tristimulus values and thereafter transforming the tristimulus values into perceptual colour space, the step of generating tristimulus values comprising applying a second predetermined algorithm which takes account of the characteristics of the first image output device.

This preferred method is particularly useful since it allows not only the appearance of an image when reproduced on a different device to be simulated but also predicts the change in appearance of a coloured image under various viewing conditions.

Preferably, the method further comprises transforming the modified LCH components into a second colour space suitable for controlling the second image output device.

For example, the first image output device may comprise a CRT monitor while the second image output device comprises a colour printer. It should be understood that one of the particular advantages of this invention is that the process can be reversed. That is, the second colour space and the first colour space may be the same so that following modification in perceptual colour space the image can be transformed back to the first colour space.

The processing means may be formed by a suitably programmed computer, hardware circuits or a combination of these.

BRIEF DESCRIPTION OF THE DRAWINGS

An example of a method and apparatus according to the invention will now be described with reference to the accompanying drawings, in which:

FIG. 2 is a block diagram of the apparatus;

BRIEF DESCRIPTION OF THE EMBODIMENTS

The apparatus shown in FIG. 2 comprises a colour phosphor monitor 1 which responds to red, green, and blue control signals to display an image. The monitor 1 is controlled by a processor 2 which is coupled to four image stores 3–5, 8 for storing red, green and blue (RGB), lightness, colourfulness and hue (LCH), cyan, magenta, yellow and black (CMYK), and tristimulus (XYZ) colour components respectively. The processor 2 is connected to a control device 6 such as a digitizing table to enable operator control and to a colour printer 7. The printer 7 responds to CMYK control signals to print a coloured version of the image.

Initially, parameters characterising the monitor 1 are derived by generating a "colour cube" with, for example, nine levels spread at approximately uniform intervals between 0% and 100% colour density for each of the three colour primaries RGB of the device, giving a total of 729 sample patches. The processor 2 causes each patch to be displayed by the monitor 1 at the centre of the screen and this is measured via a telespectroradiometer to obtain its emission spectra, from which corresponding XYZ tristimulus values can be calculated. Interpolation software routines then allow XYZ values to be calculated for any intermediate values of RGB.

Figure 1:
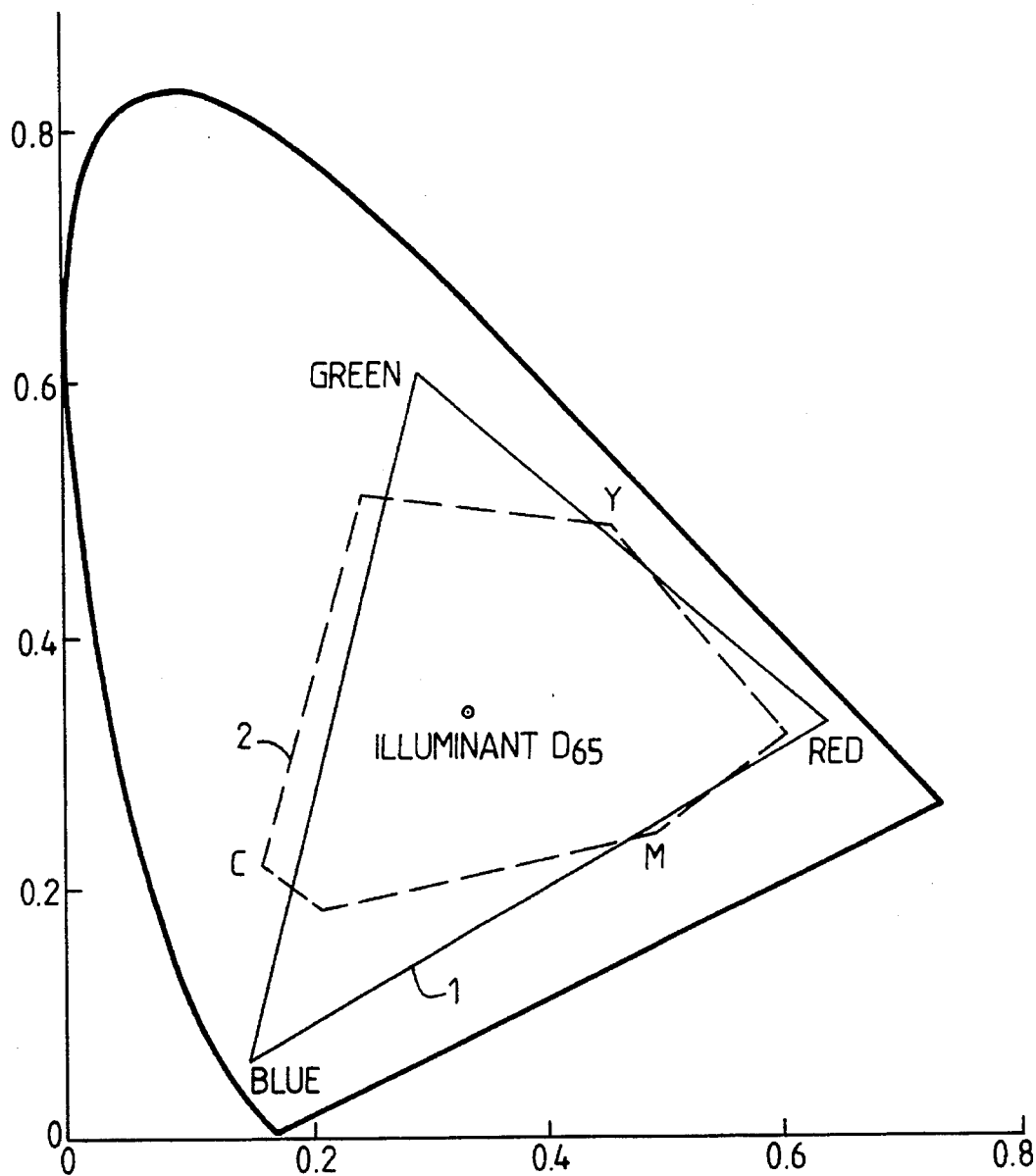
FIG. 1 is a conventional CIE chromaticity diagram.
Figure 3A:
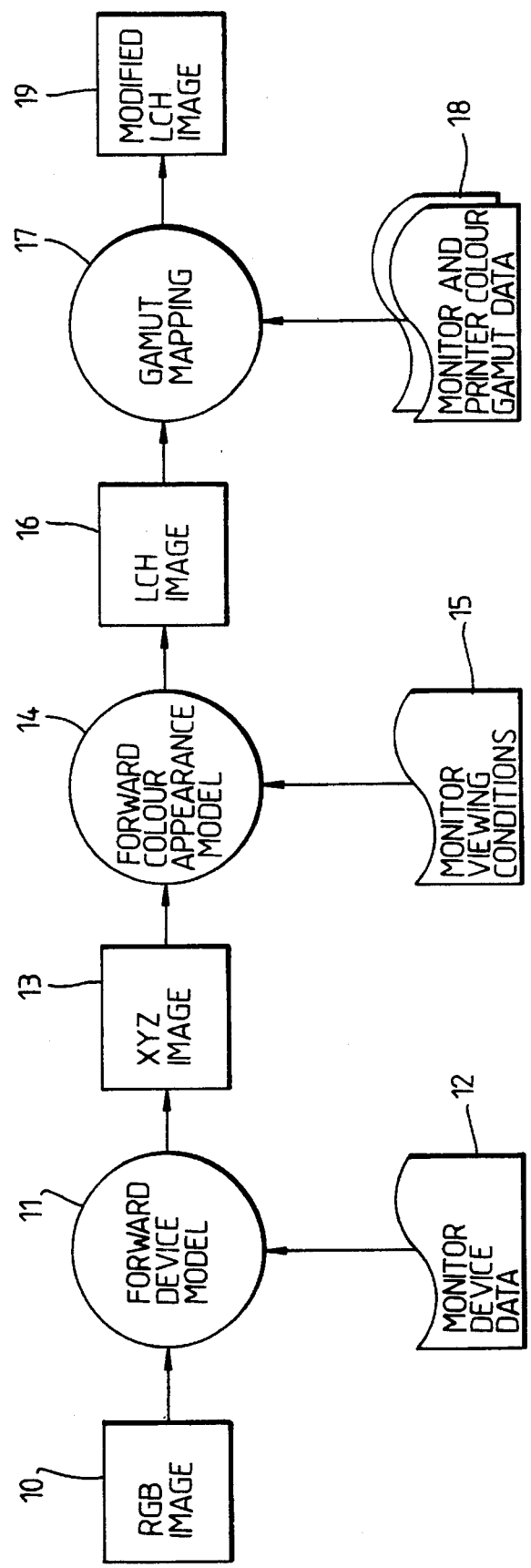
FIGS. 3A and 3B constitute a flow diagram illustrating operation of the apparatus of FIG. 2.

In this example, an image is stored in terms of RGB colour components in the store 3. This image may have been generated by scanning an original transparency using a conventional electronic scanner or may have been created electronically by the operator. The RGB image is represented by a reference numeral 10 in FIG. 3A. The operator can view the image in the store 3 by suitably controlling the processor 2 which passes the digital pixel data from the store 3 to the monitor 1 in a conventional manner. It will be assumed that the operator wishes to produce a "hard copy" version of the displayed image. This will be printed by the printer 7 but will require the conversion of the representation of the image from RGB colour space to CMYK colour space.

Initially, the processor 2 converts the image represented in the RGB store 3, pixel by pixel, into the equivalent XYZ tristimulus values which are stored in the store 8. This conversion can be considered as the application of a "forward device model" 11 which responds to the empirically derived monitor device data 12 described above. The monitor device data 12 and the forward device model 11 characterize the monitor 1 in terms of its colour gamut and transfer function.

The XYZ image 13 in the store 8 is then transformed via a colour appearance model (CAM) 14, which is governed by parameters corresponding to the monitor viewing conditions 15, into perceptual LCH coordinates 16 stored in the store 4. The CAM 14 is a comprehensive model of colour appearance that takes into account the surrounding and viewing conditions as well as the colour stimulus values of each coloured area in the image. Factors that are known to affect appearance are the luminance level and spectral power distribution of the light source(s), viewing geometry (i.e. relative angles and distance of illuminant, object and observer), surface texture and gloss, type of medium (i.e. luminous or non-luminous), and the sensitivity of the observer's visual system. Further factors within a scene can affect appearance, such as edge quality, size and shape of the area being considered, and the lightness and colour of adjacent areas and the further surround.

The CAM takes account of the fact that two colours having the same tristimulus values (XYZ) do not necessarily have the same colour appearance. In practice this is true only under very restricted conditions, namely when colour is reproduced on identical media and viewed under identical circumstances.

A suitable colour appearance model which is implemented by the processor 2 is described in the text book by R. W. G. Hunt mentioned above.

In the next stage, the operator, via the input device 6, can arrange for the processor 2 to modify the LCH image 16 so as to take account of the differences between the colour gamut of the monitor 1 and the colour gamut of the printer 7 on which the image is to be printed. This gamut mapping process is illustrated at 17 in FIG. 3A and responds to monitor and printer colour gamut data 18. Various mapping techniques are possible, as described above, but the preferred technique involves a linear mapping.

Figure 6:
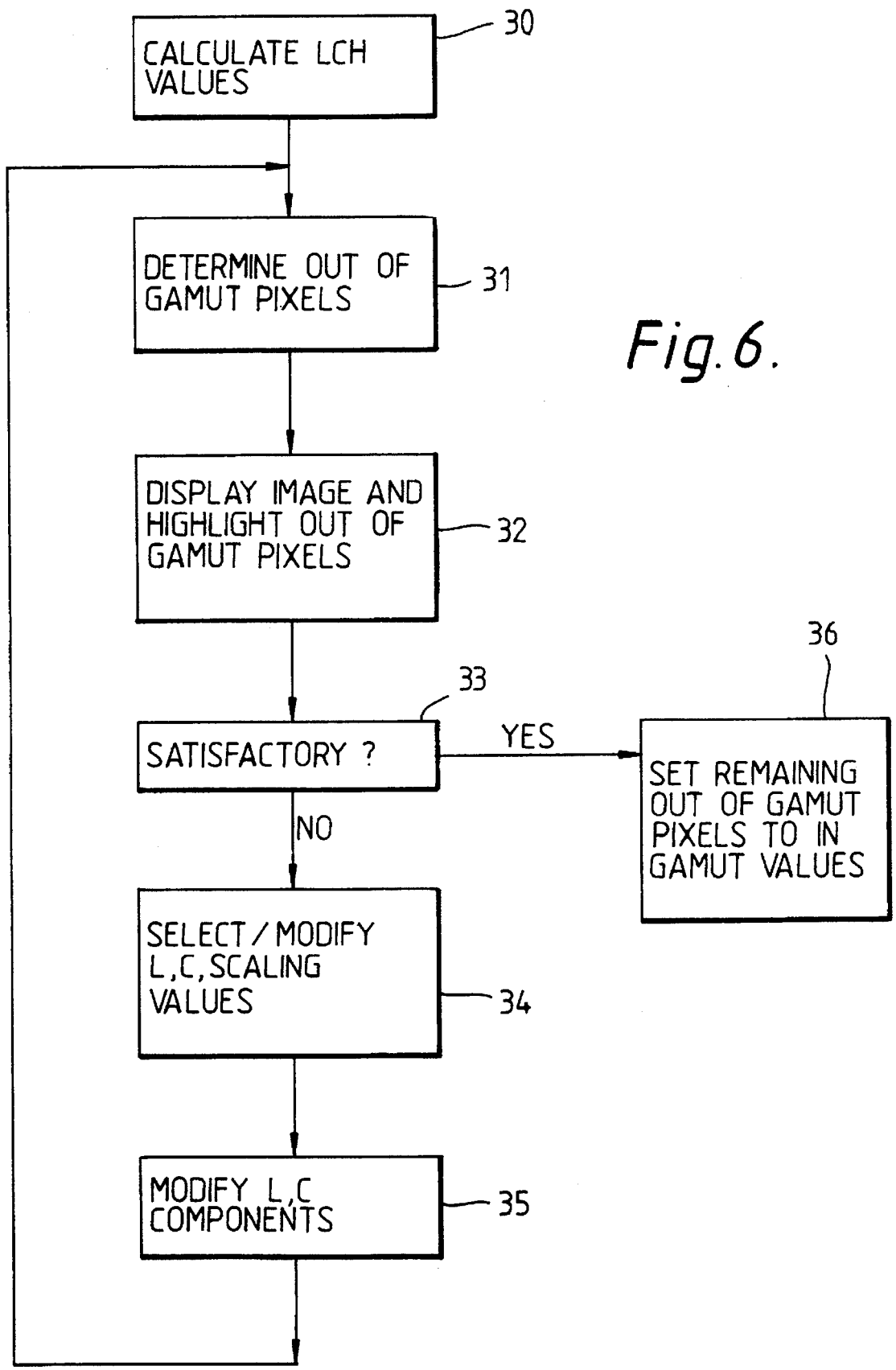
FIG. 6 is a flow diagram illustrating an example of interactive operation.

The following describes an interactive, hybrid method of determining the optimum linear scaling factors for lightness and colourfulness. It combines linear scaling and truncation, the breakpoint being determined by visual judgement of the operator:

A. Calculate (Step 30, FIG. 6) LCH values for each pixel via colour appearance model (CAM).

B. Determine which pixels are outside the common gamut subset (Step 31).

C. Overlay the image displayed on the monitor with a suitable graphic indication of which pixels are affected, e.g. by means of an obvious change in visual appearance, such as making them bright green or alternating between the normal and increased brightness (Step 32).

D. The operator considers (Step 33) the displayed image (which could be in terms of the original RGB values or obtained by conversion from the modified LCH image by reversing the process shown in FIG. 3A) and if it is not satisfactory (e.g. too many/few out of gamut pixels) selects or modifies scaling values by adjustment of the control device (Step 34). The L and C coordinates of the LCH image are then rescaled accordingly (Step 35).

E. Repeat steps B-D until the operator is satisfied with the appearance of the image.

F. Pixels remaining outside the common gamut subset are truncated in colourfulness to force them onto the gamut boundary Step 36).

Where there is no opportunity for interactive adjustment by a human operator, such as in an automatic printing process from photographic film, the breakpoint could be determined from the statistics of the pixels in the image. For example, by constructing histograms of the lightness and colourfulness values of all pixels that initially fall outside the common gamut subset, the scaling factors can be set so that 90% of these pixels are brought into gamut.

In both these interactive and non-interactive cases, it will be noted that the colours of some pixels eventually have to be truncated to the gamut boundary. This is acceptable since in many cases these colours are the result of noise in the processing means, so that the filtering action of the truncation will be beneficial. The colour appearance of an image, moreover, is a macroscopic phenomenon and is not significantly affected by the modification of isolated pixels.

Figure 5:
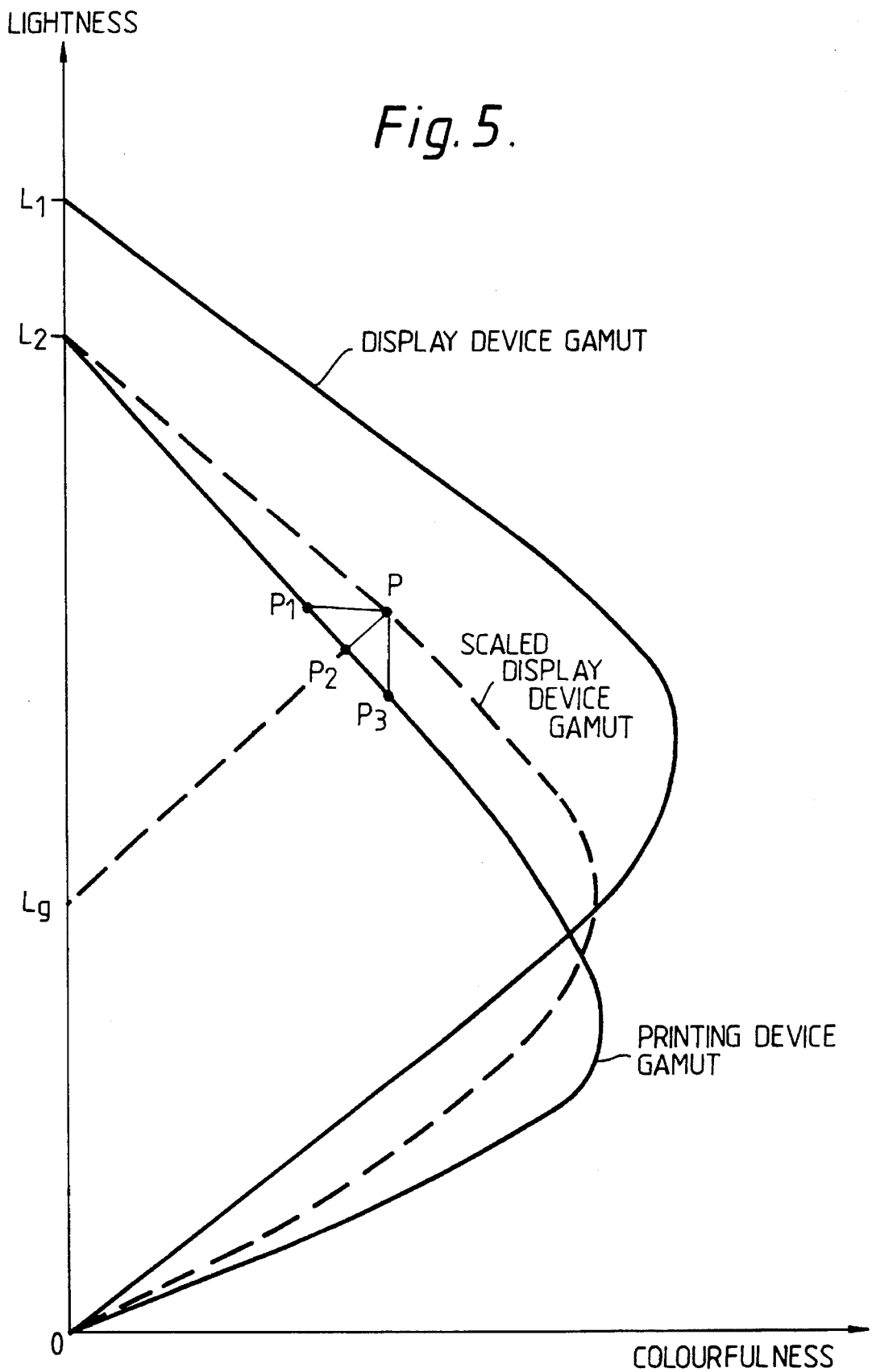
FIG. 5 illustrates graphically a gamut mapping process.

FIG. 5 shows an example of a gamut mapping procedure. Lightness (L) is plotted against colourfulness (C) for a given hue angle. The display device gamut is first scaled in both L and C by a factor of L2/L1 in order to set the reference white levels to the same value. The point P represents a colour on the boundary of the scaled display gamut, still outside the printing device gamut. Three possible strategies for truncating the colour to the common gamut subset are indicated: limit C at the same level of L (P1); limit both L and C along a line toward the 50% neutral grey point Lg (P2); or limit L at the same level of C (P3). Normally the first of these strategies would be preferred because it preserves lightness, which most affects the appearance of the image.

Figure 3B:
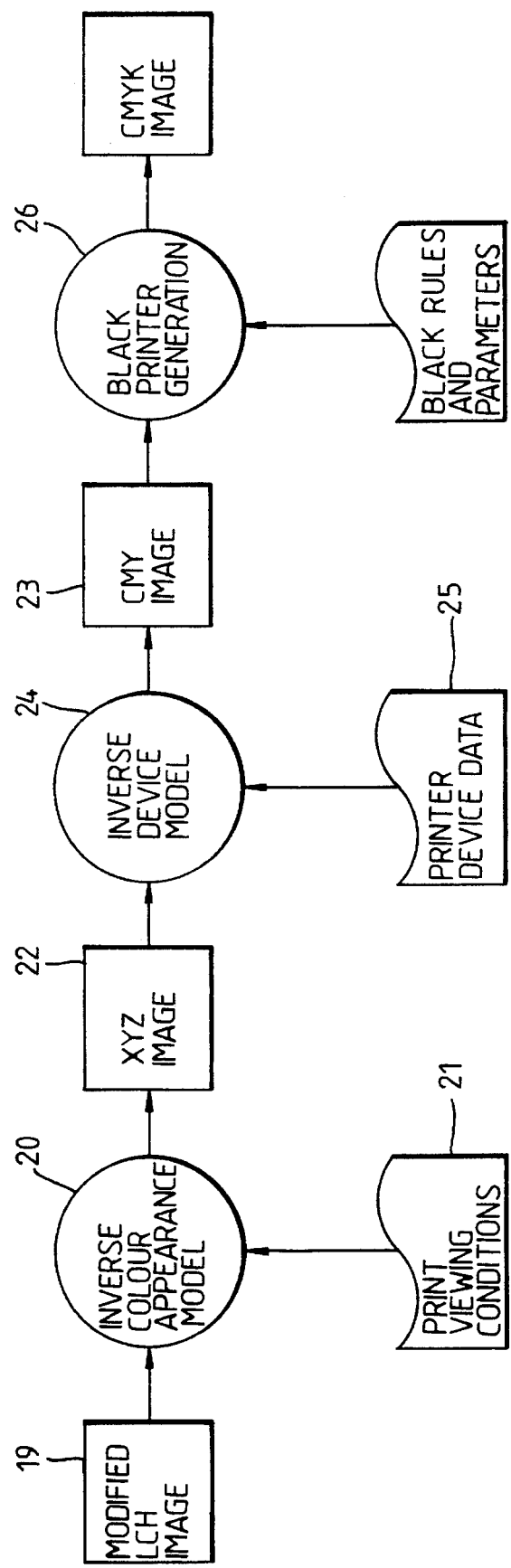

The result of the gamut mapping process 17 is a modified LCH image 19 which is stored in the store 4. This modified LCH image 19 defines the image in components with magnitudes which, upon conversion to the appropriate colour spaces, fall within the colour gamuts of the monitor 1 and the printer 7. In order to print that image, it is necessary to reverse the process so far and this is illustrated in FIG. 3B.

Firstly, the processor 2 implements an inverse colour appearance model 20 responding to print viewing conditions 21 to convert the modified LCH image 19 to an XYZ image 22 stored in the store 8. The inverse colour appearance model 20 is the direct inverse of the model 14 and can be derived by reference to the text book mentioned above.

Figure 4:
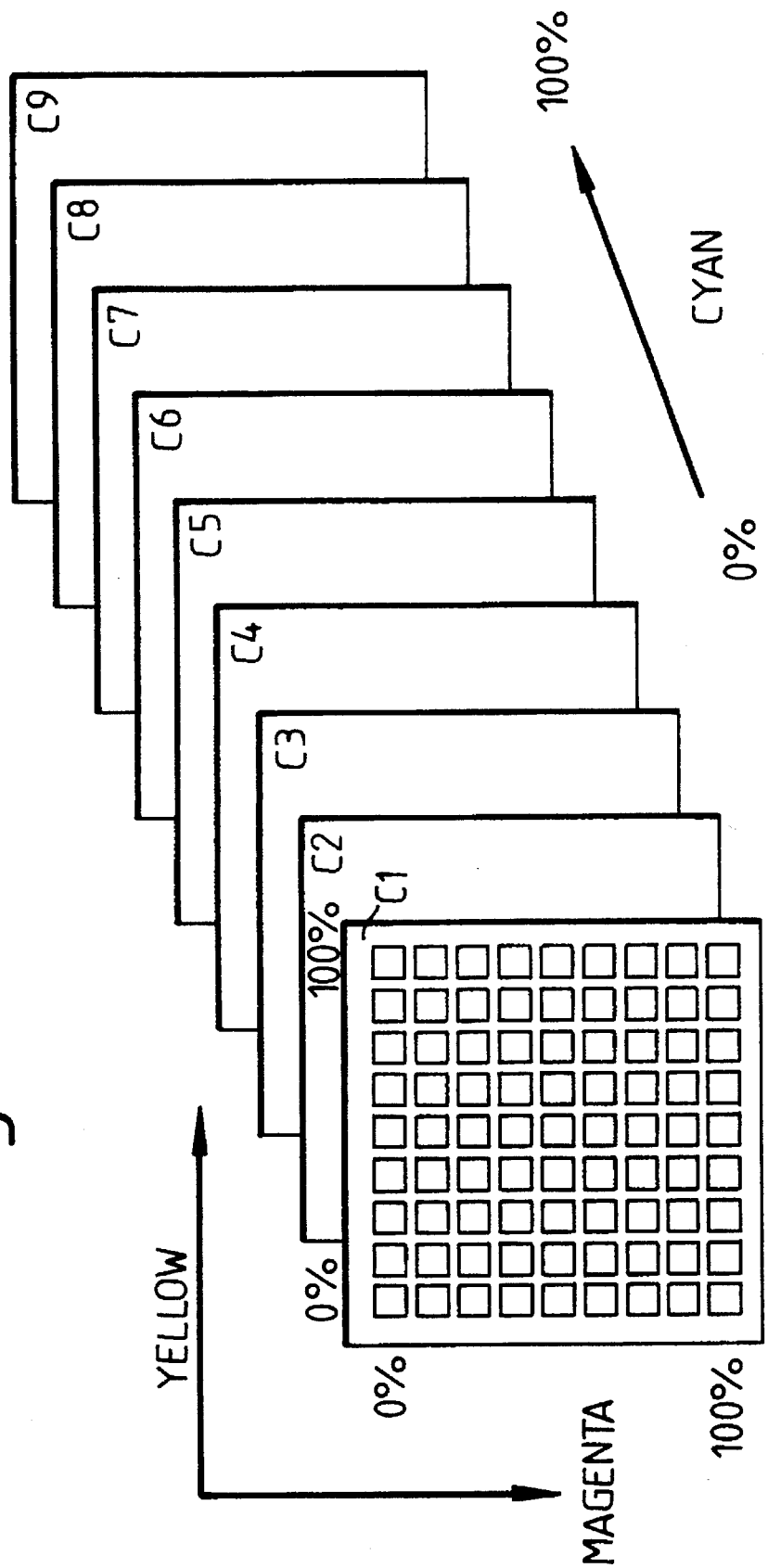
FIG. 4 illustrates a printing device calibration cube.

Next, the XYZ tristimulus image 22 is converted to a CMY image 23 by applying an inverse device model 24 which responds to printer device data 25. The inverse device model 24 is similar in form to the forward device model 11 and takes account of the colour gamut and transfer function of the printer. These can be determined in a similar manner to that previously described by generating a colour cube with nine levels spread at approximately uniform intervals between 0% and 100% colour density for each of the three colour primaries CMY to give a total of 729 sample patches. In this case of a colour printer, nine charts (C1–C9, FIG. 4) are printed each containing 9×9 sample patches. The patches are then measured individually with a spectrophotometer to obtain their absorbtion spectra, from which the XYZ tristimulus values can be calculated. Interpolation software routines allow CMY values to be calculated from intermediate XYZ values. This CMY image is stored in the store 5 and finally a black printer signal K is generated using a conventional process 26 such as under-colour removal following which the full CMYK image is stored in the store 5 for use subsequently to control the printer 7.

In order to check that there are no unprintable colours, that is outside the gamut of the printing inks, the operator may wish to make a "soft proof" on the monitor 1. In this case, the modified LCH image 19 (after gamut compression) may be transformed back to XYZ and monitor RGB signals, using the monitor viewing conditions and cube data.

We claim:

1. A method of processing data representing an image in a first colour space suitable for controlling a first image output device to produce said image, the method comprising reversibly transforming the image into a perceptual colour space defined by lightness, colourfulness and hue components, said step of transforming the image into said perceptual colour space comprising an initial step of representing the image by tristimulus values or a function thereof and thereafter transforming the tristimulus values into said perceptual colour space via a colour appearance model, whereby surrounding and viewing conditions are taken into account; modifying the lightness, colourfulness and hue components of the image in accordance with a first predetermined algorithm so that all colours in the image fall within a gamut of a second image output device, said first predetermined algorithm limiting all colours that fall outside said gamut to the boundary of said gamut leaving those colours inside unaltered; transforming said modified lightness, colourfulness and hue components into a second colour space; and outputting said image on said second image output device in accordance with said reversibly transforming and modifying steps, wherein said second image output device is responsive to control signals defining colour components in said second colour space.

2. A method of processing data representing an image in a first colour space suitable for controlling a first image output device to produce said image, the method comprising reversibly transforming the image into a perceptual colour space defined by lightness, colourfulness and hue components, said step of transforming the image into said perceptual colour space comprising an initial step of representing the image by tristimulus values or a function thereof and thereafter transforming the tristimulus values into said perceptual colour space via a colour appearance model, whereby surrounding and viewing conditions are taken into account; modifying the lightness, colourfulness and hue components of the image in accordance with a first predetermined algorithm so that all colours in the image fall within a gamut of a second image output device, said first predetermined algorithm being interactively generated by:

a) displaying the image as represented in said perceptual colour space and indicating on a display those pixels whose colours fall outside the gamut of the second image output device;

b) generating scaling factors for one or more of the lightness, colourfulness and hue components;

c) modifying the image as represented in said perceptual colour space in accordance with the scaling factors;

d) repeating steps a–c until the displayed image is satisfactory; and thereafter;

e) setting any remaining pixels whose colours fall outside the gamut of the second image output device to colours within the gamut;

said method further comprising transforming said modified lightness, colourfulness and hue components into a second colour space; and outputting said image on said second image output device in accordance with said reversibly transforming and modifying steps, wherein said second image output device is responsive to control signals defining colour components in said second colour space.

3. A method according to claim 2, wherein said step e) comprises adjusting said colourfulness component while keeping said hue and lightness components constant.

4. A method of processing data representing an image in a first colour space suitable for controlling a first image output device to produce said image, the method comprising reversibly transforming the image into a perceptual colour space defined by lightness, colourfulness and hue components, said step of transforming the image into said perceptual colour space comprising an initial step of representing the image by tristimulus values or a function thereof and thereafter transforming the tristimulus values into said perceptual colour space via a colour appearance model, whereby surrounding and viewing conditions are taken into account, said initial step of representing the image by tristimulus values comprising applying a second predetermined algorithm which takes account of colour reproduction characteristics of the first image output device; modifying the lightness, colourfulness and hue components of the image in accordance with a first predetermined algorithm so that all colours in the image fall within a gamut of a second image output device; transforming said modified lightness, colourfulness and hue components into a second colour space; and outputting said image on said second image output device in accordance with said reversibly transforming and modifying steps, wherein said second image output device is responsive to control signals defining colour components in said second colour space.

5. A method of processing data representing an image in a first colour space suitable for controlling a first image output device to produce said image, the method comprising reversibly transforming the image into a perceptual colour space defined by lightness, colourfulness and hue components, said step of transforming the image into said perceptual colour space comprising an initial step of representing the image by tristimulus values or a function thereof and thereafter transforming the tristimulus values into said perceptual colour space via a colour appearance model, whereby surrounding and viewing conditions are taken into account; modifying the lightness, colourfulness and hue components of the image in accordance with a first predetermined algorithm so that all colours in the image fall within a gamut of a second image output device, said first predetermined algorithm being generated by constructing histograms of lightness, colourfulness, and hue values of the pixels of the image; generating scaling factors for the lightness, colourfulness and hue components so that a proportion of the pixels falling outside the gamut of the second image output device are brought within the gamut and modifying the image as represented in perceptual colour space in accordance with the scaling factors; and setting any remaining pixels whose colours fall outside the gamut of the second image output device to colours within the gamut; said method further comprising transforming said modified lightness, colourfulness and hue components into a second colour space; and outputting said image on said second image output device in accordance with said reversibly transforming and modifying steps, wherein said second image output device is responsive to control signals defining colour components in said second colour space.

6. A method according to claim 5, wherein said proportion is substantially 90%.

7. A method of processing data representing an image in a first colour space suitable for controlling a first image output device to produce said image, the method comprising reversibly transforming the image into a perceptual colour space defined by lightness, colourfulness and hue components, said step of transforming the image into said perceptual colour space comprising an initial step of representing the image by tristimulus values or a function thereof and thereafter transforming the tristimulus values into said perceptual colour space via a colour appearance model, whereby surrounding and viewing conditions are taken into account; modifying the lightness, colourfulness and hue components of the image in accordance with a first predetermined algorithm so that all colours in the image fall within a gamut of a second image output device, said colourfulness component being scaled by a predetermined factor, wherein said factor varies as a function of hue;

transforming said modified lightness, colourfulness and hue components into a second colour space; and outputting said image on said second image output device in accordance with said reversibly transforming and modifying steps, wherein said second image output device is responsive to control signals defining colour components in said second colour space.

8. Apparatus for processing data representing an image in a first colour space suitable for controlling a first image output device to produce said image, the apparatus comprising a processor (11, 14, 17) for reversibly transforming the image into a perceptual colour space defined by lightness, colourfulness and hue components, said step of transforming the image into said perceptual colour space comprising an initial step of representing the image by tristimulus values or a function thereof and thereafter transforming the tristimulus values into said perceptual colour space via a colour appearance model, whereby surrounding and viewing conditions are taken into account, for modifying the lightness, colourfulness and hue components of the image in accordance with a first predetermined algorithm so that all colours in the image fall within a gamut of a second image output device and for outputting said image on said second image output device in accordance with said reversibly transforming and said modifying steps, wherein said processor comprises means for generating said first predetermined algorithm by constructing histograms of the lightness, colourfulness, and hue components of the pixels of the image; means for generating scaling factors for the lightness, colourfulness and hue components so that a proportion of the pixels falling outside the gamut of the second image output device are brought within the gamut; means for modifying the image as represented in said perceptual colour space in accordance with the scaling factors; and means for setting any remaining pixels whose colours fall outside the gamut of the second output device to colours which fall within the gamut of said second output device; the apparatus further comprising a display to allow an operator to judge the appearance of said modified image, said processor enabling the scaling factors to be adjusted; and a storage device for storing data defining the modified and unmodified lightness, colourfulness and hue components.

\* \* \* \* \*